(12) United States Patent
Iordanoglou (10) Patent No.: US 10,584,882 B2
(45) Date of Patent: Mar. 10, 2020

(54) ELECTRIC COOKTOP APPLIANCE WITH HEAT CONTROL

(71) Applicant: Haier US Appliance Solutions, Inc., Wilmington, DE (US)

(72) Inventor: Dimitrios Iordanoglou, Prospect, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 343 days.

(21) Appl. No.: 15/442,740

(22) Filed: Feb. 27, 2017

(65) Prior Publication Data

US 2018/0245796 A1    Aug. 30, 2018

(51) Int. Cl.
*F24C 7/08* (2006.01)
*H05B 3/74* (2006.01)
*G01K 3/10* (2006.01)
*F24C 15/10* (2006.01)

(52) U.S. Cl.
CPC ............ *F24C 7/087* (2013.01); *F24C 15/105* (2013.01); *G01K 3/10* (2013.01); *H05B 3/746* (2013.01); *G01K 2207/06* (2013.01)

(58) Field of Classification Search
CPC ......... F24C 7/087; F24C 15/105; G01K 3/10; G01K 2207/06; H05B 2203/035; H05B 3/746

USPC ............................................ 219/448.12, 441
See application file for complete search history.

(56) References Cited

U.S. PATENT DOCUMENTS

| 6,555,793 B2 | 4/2003 | Griffiths et al. | |
| 9,220,130 B1 | 12/2015 | Smith | |
| 2005/0016990 A1* | 1/2005 | Wilkins | H05B 3/746 219/494 |
| 2006/0213901 A1* | 9/2006 | Wilkins | H05B 3/746 219/492 |

* cited by examiner

*Primary Examiner* — Lorne E Meade
*Assistant Examiner* — Joe E Mills, Jr.
(74) *Attorney, Agent, or Firm* — Dority & Manning, P.A.

(57) ABSTRACT

A cooktop appliance includes an electric heating element positioned below a ceramic plate. A temperature sensor is positioned proximate a bottom surface of the ceramic plate. The temperature sensor may be offset from a center of the electric heating element. A controller is configured to receive a plurality of temperature measurements from the temperature sensor, determine a change between the plurality of temperature measurements over time, calculate a value of a control criterion with the change between the plurality of temperature measurements over time, and open a relay in response to the value of the control criterion passing a threshold value. A related method for operating a cooktop appliance is also provided.

16 Claims, 5 Drawing Sheets

ELECTRIC COOKTOP APPLIANCE WITH HEAT CONTROL

FIELD OF THE INVENTION

The present subject matter relates generally to cooktop appliances, such as radiant or induction cooktop appliances, and systems for controlling heating by the cooktop appliances.

BACKGROUND OF THE INVENTION

Certain cooktop appliances include electric heating elements for heating pots, pans and other containers with food items therein. The electric heating elements can be operated at various settings. For example, the electric heating elements can be operated at a low heat setting to simmer food items, or the electric heating elements can be operated at a high heat setting to boil water or fry food items.

Operating the electric heating elements on the high heat setting poses challenges. For example, product safety certifications frequently require appliances with electric heating elements to operate below temperature limits at the high heat settings. However, controlling heating of electric heating elements to avoid overheating while also avoiding unnecessary deactivation of the electric heating elements can be difficult.

Accordingly, a cooktop appliance with an electric heating element and features for accurately regulating heating of utensil on the cooktop appliance would be useful.

BRIEF DESCRIPTION OF THE INVENTION

The present subject matter provides a cooktop appliance that includes an electric heating element positioned below a ceramic plate. A temperature sensor is positioned proximate a bottom surface of the ceramic plate. The temperature sensor may be offset from a center of the electric heating element. A controller is configured to receive a plurality of temperature measurements from the temperature sensor, determine a change between the plurality of temperature measurements over time, calculate a value of a control criterion with the change between the plurality of temperature measurements over time, and open a relay in response to the value of the control criterion passing a threshold value. A related method for operating a cooktop appliance is also provided. Additional aspects and advantages of the invention will be set forth in part in the following description, or may be apparent from the description, or may be learned through practice of the invention.

In a first exemplary embodiment, a cooktop appliance is provided. The cooktop appliance includes a ceramic plate. An electric heating element is positioned below the ceramic plate. A temperature sensor is positioned proximate a bottom surface of the ceramic plate. The temperature sensor is positioned above the electric heating element. A relay is coupled to the electric heating element. The relay is operable to selectively terminate electrical power to the electric heating element. A controller is in operative communication with the temperature sensor and the relay. The controller configured to receive a plurality of temperature measurements from the temperature sensor, determine a change between the plurality of temperature measurements over time, calculate a value of a control criterion with the change between the plurality of temperature measurements over time, the control criterion being a function of at the least a temperature change with respect to time, and open the relay in response to the value of the control criterion passing a threshold value.

In a second exemplary embodiment, a method for operating a cooktop appliance is provided. The method includes activating an electric heating element of the cooktop appliance. The electric heating element is positioned below a ceramic plate of the cooktop appliance. The method also includes receiving a plurality of temperature measurements from a temperature sensor of the cooktop appliance. The temperature sensor is positioned proximate a bottom surface of the ceramic plate. The temperature sensor is positioned above the electric heating element. The method also includes determining a change between the plurality of temperature measurements over time, calculating a value of a control criterion with the change between the plurality of temperature measurements over time, the control criterion being a function of at the least a temperature change with respect to time, and opening a relay of the cooktop appliance in response to the value of the control criterion passing a threshold value. The relay is coupled to the electric heating element such that the relay is operable to selectively terminate electrical power to the electric heating element.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
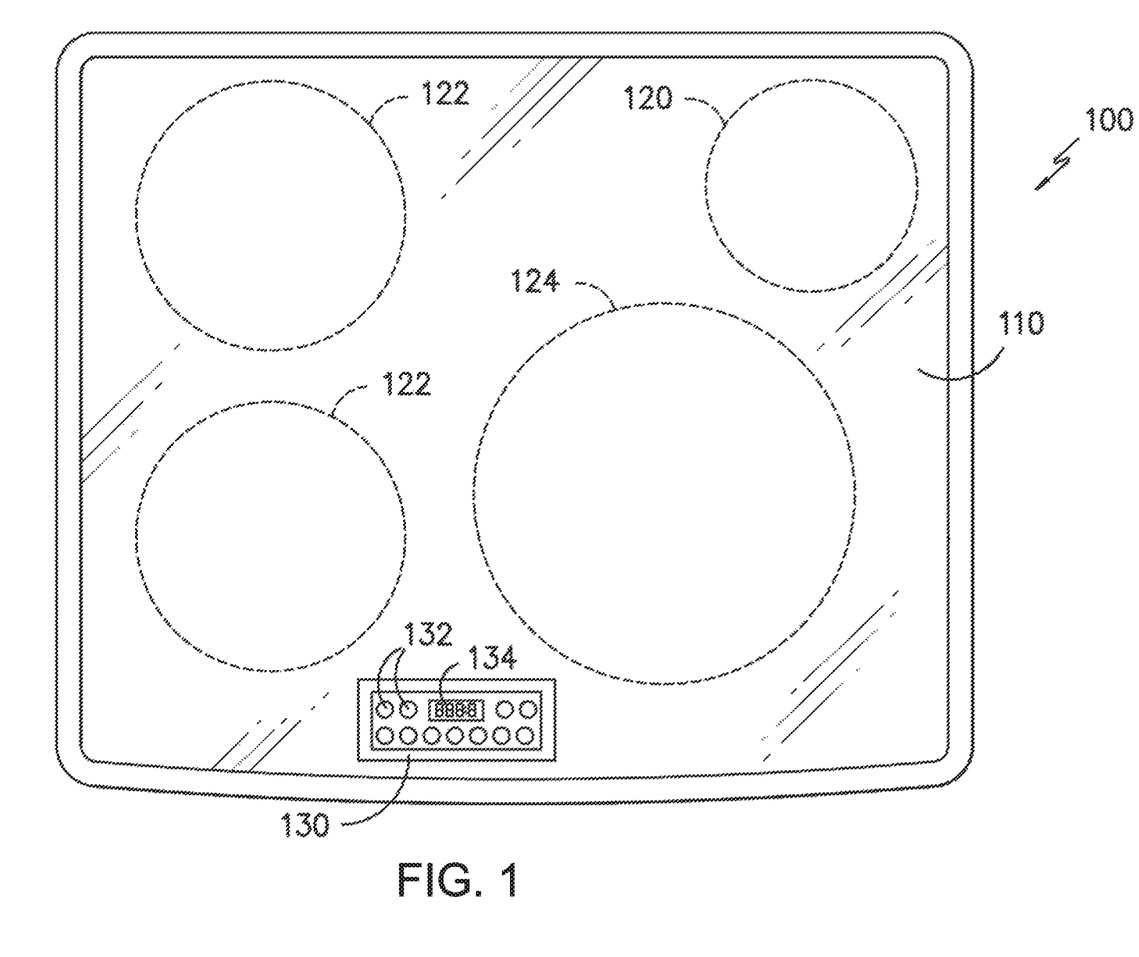
FIG. 1 provides a top, plan view of a cooktop appliance according to an exemplary embodiment of the present subject matter.

FIG. 1 provides a top, plan view of a cooktop appliance 100 according to an exemplary embodiment of the present subject matter. Cooktop appliance 100 can be installed in various locations such as in cabinetry in a kitchen, with one or more ovens to form a range appliance, or as a standalone appliance. Thus, as used herein, the term "cooktop appliance" includes grill appliances, stove appliances, range appliances, and other appliances that incorporate cooktops.

Figure 3:
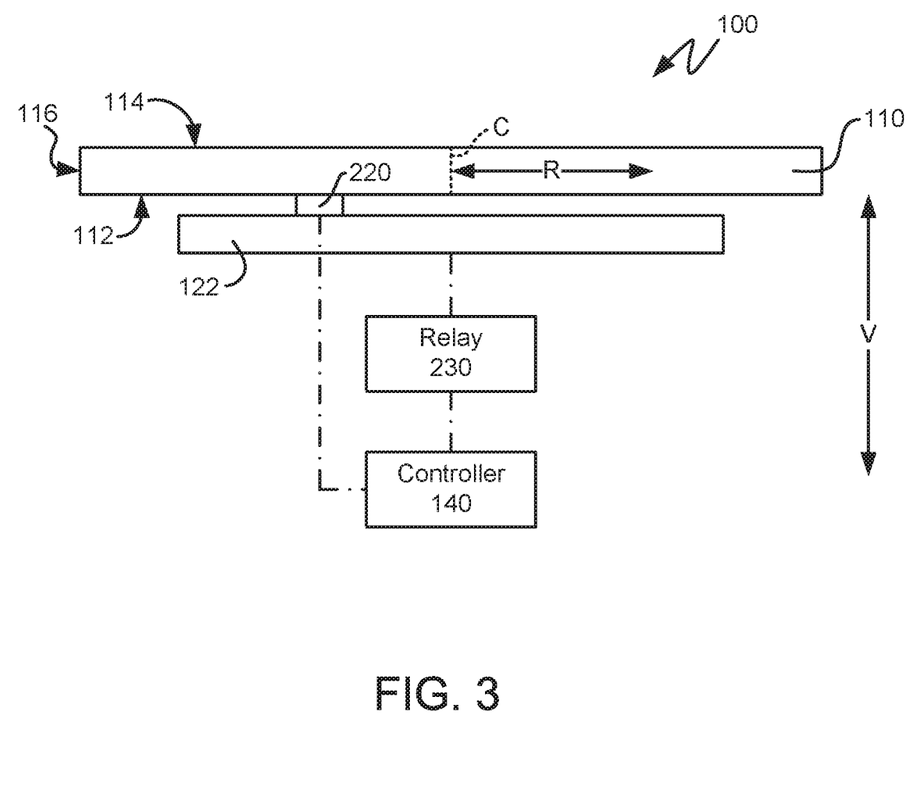
FIG. 3 provides a schematic view of certain components of the exemplary cooktop appliance of FIG. 1.

Cooktop appliance 100 includes a ceramic plate 110 for supporting cooking utensils, such as pots or pans, on a cooking or top surface 114 of ceramic plate 110. Ceramic plate 110 may be any suitable ceramic or glass plate. Radiant heating assemblies 120, 122 and 124 are mounted below ceramic plate 110 such that heating assemblies 120, 122 and 124 are positioned below ceramic plate 110, e.g., along a vertical direction V (FIG. 3). Ceramic plate 110 may be continuous over heating assemblies 120, 122 and 124. Thus, no holes may extend vertically through ceramic plate 110 above heating assemblies 120, 122 and 124. However, it will be understood that a hole may extend through ceramic plate 110 at one of heating assemblies 120, 122 and 124, in certain exemplary embodiments.

While shown with four heating assemblies 120, 122 and 124 in the exemplary embodiment of FIG. 1, cooktop appliance 100 may include any number of heating assemblies 120, 122 and 124 in alternative exemplary embodiments. Heating assemblies 120, 122 and 124 can also have various diameters. For example, each heating assembly of heating assemblies 120, 122 and 124 can have a different diameter, the same diameter, or any suitable combination thereof. In addition, heating assembly 120 includes one radiant heating element or zone. Conversely, heating assemblies 122 include two radiant heating elements or zones, and heating assembly 124 includes three radiant heating elements or zones. However, cooktop appliance 100 is provided by way of example only and is not limited to the exemplary embodiment shown in FIG. 1. For example, a cooktop appliance having one or more radiant heating assemblies in combination with one or more electric resistance or gas burner heating elements can be provided. In addition, various combinations of number of heating assemblies, position of heating assemblies and/or size of heating assemblies can be provided. It will also be understood that the present subject matter is suitable for use with other electric heating elements, such as induction heating elements.

A user interface 130 provides visual information to a user and allows a user to select various options for the operation of cooktop appliance 100. For example, displayed options can include a desired heating assemblies 120, 122 and 124, a desired cooking temperature, and/or other options. User interface 130 can be any type of input device and can have any configuration. In FIG. 1, user interface 130 is located within a portion of ceramic plate 110. Alternatively, user interface 130 can be positioned on a vertical surface near a front side of cooktop appliance 100 or anywhere convenient for a user to access during operation of cooktop appliance 100.

In the exemplary embodiment shown in FIG. 1, user interface 130 includes a capacitive touch screen input device component 132. Capacitive touch screen input device component 132 can allow for the selective activation, adjustment or control of any or all heating assemblies 120, 122 and 124 as well as any timer features or other user adjustable inputs. One or more of a variety of electrical, mechanical or electro-mechanical input devices including rotary dials, push buttons, toggle/rocker switches, and/or touch pads can also be used singularly or in combination with capacitive touch screen input device component 132. User interface 130 also includes a display component 134, such as a digital or analog display device designed to provide operational feedback to a user.

Figure 2:
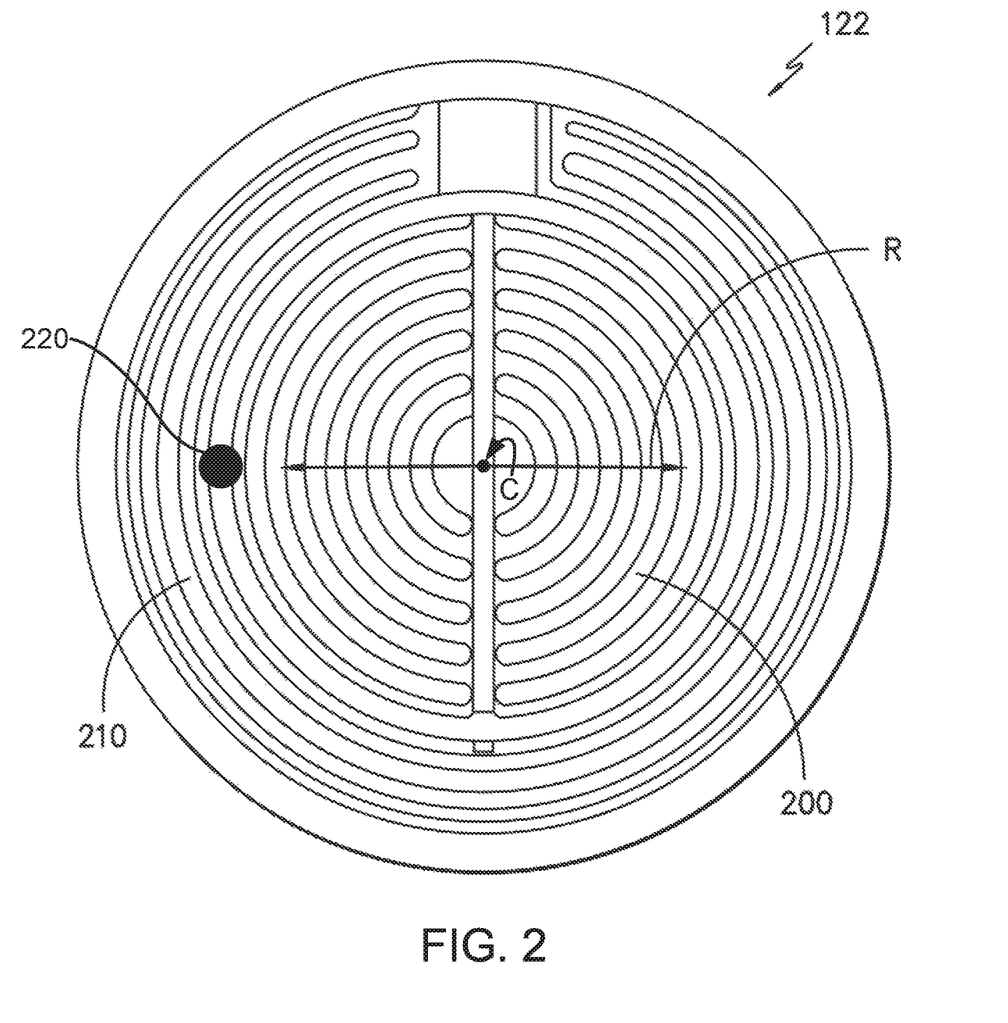
FIG. 2 provides a top, plan view of a two element, electric heating assembly of the exemplary cooktop appliance of FIG. 1.

FIG. 2 provides a top, plan view of heating assembly 122 of cooktop appliance 100 (FIG. 1). As may be seen in FIG. 2, heating assembly 122 includes a first or inner heating element 200 and a second or outer heating element 210. Outer heating element 210 of heating assembly 122 is positioned concentrically relative to inner heating element 200 of heating assembly 122. In particular, inner heating element 200 of heating assembly 122 and outer heating element 210 of heating assembly 122 are spaced apart from each other, e.g., along a radial direction R, such that outer heating element 210 of heating assembly 122 extends circumferentially around at least a portion of inner heating element 200 of heating assembly 122.

FIG. 3 provides a schematic view of certain components of cooktop appliance 100. As may be seen in FIG. 3, cooktop appliance 100 includes a controller 140. Operation of cooktop appliance 100 is regulated by controller 140. Controller 140 is operatively coupled or in communication with various components of cooktop appliance 100, including user interface 130. In response to user manipulation of the user interface 130, controller 140 operates the various components of cooktop appliance 100 to execute selected cycles and features.

Controller 140 may include a, e.g., non-transitory, memory and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 140 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. User input 130 and other components of cooktop appliance 100 may be in communication with controller 140 via one or more signal lines or shared communication busses.

As shown in FIGS. 2 and 3, cooktop appliance 100 includes a temperature sensor 220. Temperature sensor 220 may be any suitable type of temperature sensor, such as a thermocouple, a thermistor, etc. Temperature sensor 220 is positioned proximate a bottom surface 112 of ceramic plate 110 above heating assembly 122. A signal(s) from temperature sensor 220 corresponds to a temperature of ceramic plate 110 and/or to a temperature of a cooking utensil on ceramic plate 110 above heating assembly 122.

Temperature sensor 220 is positioned above heating assembly 122 such that temperature sensor 220 may be offset from a center C of heating assembly 122, e.g., along the radial direction R. Temperature sensor 220 may also be inset from an outer edge 116 of heating assembly 122, e.g., along the radial direction R. Thus, temperature sensor 220 may be positioned between center C of heating assembly 122 and outer edge 116 of heating assembly 122 along the radial direction R. Center C of heating assembly 122 may correspond to a radial center of heating assembly 122, and outer edge 116 of heating assembly 122 may correspond to an outermost portion of heating assembly 122 relative to center C along the radial direction R. As an example, temperature sensor 220 may be positioned at a junction between inner and outer heating elements 200, 210 of heating assembly 122 along the radial direction R.

Temperature sensor 220 may be offset from center C of heating assembly 122 along the radial direction R by no less than one inch and no more than eight inches, in certain exemplary embodiments. Such spacing of temperature sensor 220 from center C of heating assembly 122 may increase accuracy of temperature sensor 220 when a cooking utensil on ceramic plate 110 above heating assembly 122 has a curved, e.g., concave, bottom surface, above center C of heating assembly 122, and e.g., the cooking utensil does not contact ceramic plate 110 directly above center C of heating assembly 122.

Temperature sensor 220 may be mounted to and/or contact bottom surface 112 of ceramic plate 110. Thus, temperature sensor 220 may be positioned between ceramic plate 110 and heating assembly 122, e.g., along the vertical direction V. In alternative exemplary embodiments, temperature sensor 220 may be mounted to other components of cooktop appliance 100, such as heating assembly 122, and may be spaced from ceramic plate 110 along the vertical direction V.

Controller 140 is also in operative communication with heating assemblies 120, 122 and 124 of cooktop appliance 100. As may be seen in FIG. 3, heating assembly 122 includes a relay 230. Relay 230 of heating assembly 122 is coupled to inner heating element 200 of heating assembly 122 and outer heating element 210 of heating assembly 122. Utilizing relay 230, controller 140 can selectively activate and deactivate inner heating element 200 of heating assembly 122 and outer heating element 210 of heating assembly 122. Controller 140 may open and close relay 230 in response to temperature measurements from temperature sensor 220, as discussed in greater detail below. It will be understood that heating assemblies 120 and 124 may also include respective temperature sensors and relays, in the same or similar manner to that described above for heating assembly 122.

Figure 4:
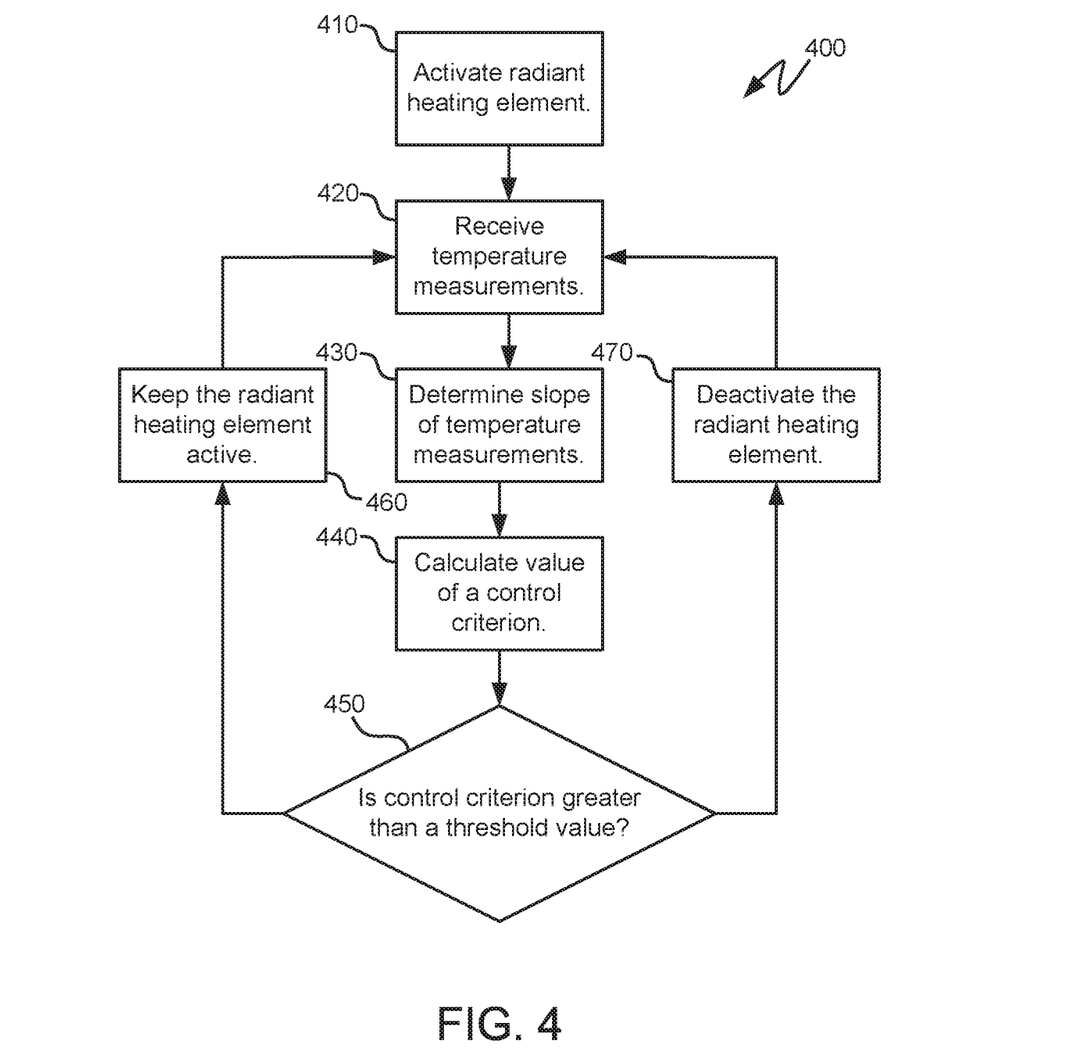
FIG. 4 illustrates a method of operating a cooktop appliance according to an exemplary embodiment of the present subject matter.

FIG. 4 illustrates a method 400 for operating a cooktop appliance according to an exemplary embodiment of the present subject matter. Method 400 can be used to operate any suitable cooktop appliance. As an example, method 400 may be used to operate cooktop appliance 100 (FIG. 1). Controller 140 (FIG. 3) may be programmed to implement method 400. Utilizing method 400, controller 140 regulates heating of a cooking utensil on ceramic plate 110 such that a temperature of the cooking utensil is less than a threshold temperature.

At 410, controller 140 activates heating assembly 122. For example, controller 140 may close relay 230 in order to activate heating assembly 122 at 410. When heating assembly 122 is active, heat transfer from heating assembly 122 to a cooking utensil on ceramic plate 110 over heating assembly 122 may increase a temperature of the cooking utensil.

At 420, controller 140 receives a plurality of temperature measurements from temperature sensor 220. Heating assembly 122 may be activated at 420. Thus, the temperature measurements from temperature sensor 220 may increase over time during 420. Heating assembly 122 may also be deactivated at 420. Thus, the temperature measurements from temperature sensor 220 may decrease over time during 420. At 430, controller 140 determines a slope or a change between the temperature measurements from 420 over time.

At 440, controller 140 calculates a value of a control criterion with the change between the temperature measurements over time from 430. Thus, the control criterion is a function of at the least a temperature change with respect to time. The control criterion may also be a function of temperature. The control criterion may be any suitable function of a temperature change with respect to time. For example, the control criterion may be a linear combination of temperature and the temperature change with respect to time. In particular, the control criterion may be written as $$F\left(T, \frac{dT}{dt}\right) = A - B * \frac{dT}{dt} - T$$

where
F is the control criterion function,
T is temperature,
t is time,
dT/dt is temperature change with respect to time,
A is a first constant, and
B is a second constant.

The value of the control criterion calculated at 440 is compared to a threshold value at 450. The threshold value and/or the values of A and B may be selected such that heating assembly 122 does not heat a cooking utensil on ceramic plate 100 to more than seven hundred and fifty degrees Fahrenheit (750° F.) when heating assembly 122 is activated. The threshold value and/or the values of A and B may be predetermined, e.g., by a manufacturer of cooktop appliance 100, and saved within the memory of controller 140. As an example, the threshold value may be about zero. As used herein, the term "about" means within ±3 of the stated threshold value when used in the context of control criterion threshold values. The threshold value may also vary depending upon the crossing direction. For example, when the control criterion is changing from lower to higher values, i.e., increasing, the threshold value may be positive three (3). However, when the control criterion is changing from higher to lower values, i.e., decreasing, the threshold value may be negative three (−3).

As noted above, controller 140 compares the value of the control criterion calculated at 440 to the threshold value at 450. For example, depending upon the selected control criterion and threshold value, comparing the value of the control criterion calculated at 440 to the threshold value at 450 may include determining that the value of the control criterion calculated at 440 is greater than (or less than) the threshold value. Controller 140 may open or close relay 230 depending upon the value of the control criterion calculated at 440 relative to the threshold value. In particular, controller 140 opens relay 230 in response to the value of the control criterion from 440 passing or crossing the threshold value at 450. Relay 230 terminates electrical power to heating assembly 122 when relay 230 is open. In contrast, controller 140 keeps relay 230 closed in response to the value of the control criterion from 440 not passing (e.g., exceeding) the threshold value at 450. Thus, heating assembly 122 continues to heat ceramic plate 110 and cooking utensils thereon when the value of the control criterion from 440 does not pass the threshold value at 450.

Utilizing method 400, controller 140 can maintain the temperature of a cooking utensil on ceramic plate 110 below a threshold temperature, such as an auto ignition temperature of oil, during operation of heating assembly 122, while also limiting deactivation of heating assembly 122. For example, when the control criterion is a function of both temperature and temperature change with respect to time, method 400 may assist with avoiding exceeding the threshold temperature due to the temperature lag between readings from temperature sensor 220 and the actual temperature of the cooking utensil on ceramic plate 110.

Figure 5:
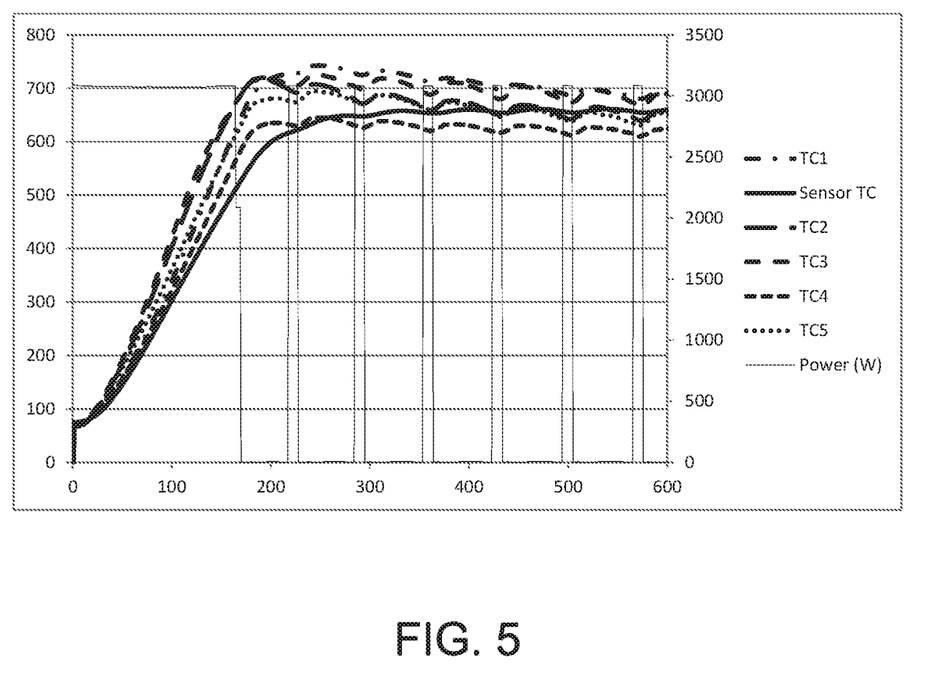
FIG. 5 provides a plot of temperature sensor measurements during operation of the exemplary cooktop appliance of FIG. 1 according to the exemplary method of FIG. 4.

FIG. 5 provides a plot of temperature sensor measurements during operation of cooktop appliance 100 according method 400. In FIG. 5, the temperature measurements labeled "TC1", "TC2", "TC3", "TC4" and "TC5" correspond to temperature sensor measurements at various locations within a cooking utensil on ceramic plate 110 above heating assembly 122. The temperature measurements labeled "Sensor TC" correspond to temperature sensor measurements from temperature sensor 220. As may be seen in FIG. 5, by configuring controller 140 to implement method 400 and thereby open and close relay 230, the temperature of the cooking utensil on ceramic plate 110 above heating assembly 122 does not exceed seven hundred and fifty degrees Fahrenheit (750° F.) despite the readings of temperature sensor 220 lagging behind the temperature of the cooking utensil on ceramic plate 110 above heating assembly 122 during an initial three to four minutes of operating the heating assembly 122. Thus, method 400 may effectively maintain the temperature of a cooking utensil on ceramic plate 110 below a threshold temperature based upon temperature measurements from temperature sensor 220.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooktop appliance, comprising:
   a ceramic plate;
   an electric heating element positioned below the ceramic plate;
   a temperature sensor positioned proximate a bottom surface of the ceramic plate, the temperature sensor positioned above the electric heating element;
   a relay coupled to the electric heating element, the relay operable to selectively terminate electrical power to the electric heating element; and
   a controller in operative communication with the temperature sensor and the relay, the controller configured to
   receive a plurality of temperature measurements from the temperature sensor,
   determine a change between the plurality of temperature measurements over time,
   calculate a value of a control criterion with the change between the plurality of temperature measurements over time, the control criterion being a function of temperature and a temperature change with respect to time, and
   open the relay in response to the calculated value of the control criterion passing a threshold criterion value,
   wherein the controller calculates the control criterion with $$F\left(T, \frac{dT}{dt}\right) = A - B * \frac{dT}{dt} - T$$

where
F is the control criterion function,
T is temperature,
t is time,
dT/dt is temperature change with respect to time,
A is a first constant, and
B is a second constant.

2. The cooktop appliance of claim 1, wherein the controller is configured to open the relay in response to the calculated value of the control criterion passing the threshold criterion value or keep the relay closed in response to the calculated value of the control criterion not passing the threshold criterion value.

3. The cooktop appliance of claim 1, wherein the relay terminates electrical power to the electric heating element when the relay is open.

4. The cooktop appliance of claim 1, wherein the threshold criterion value is about zero.

5. The cooktop appliance of claim 1, wherein values of A and B and the threshold criterion value are saved in a memory of the controller and are selected such that the electric heating element does not heat a cooking utensil on the ceramic plate to more than seven hundred and fifty degrees Fahrenheit.

6. The cooktop appliance of claim 1, wherein the temperature sensor is radially offset from a center of the electric heating element by no less than one inch and no more than eight inches.

7. The cooktop appliance of claim 1, wherein the temperature sensor is radially offset from a center of the electric heating element and radially inset from an outer edge of the electric heating element.

8. The cooktop appliance of claim 7, wherein the temperature sensor contacts the bottom surface of the ceramic plate such that the temperature sensor is positioned between the ceramic plate and the electric heating element.

9. A method for operating a cooktop appliance, comprising:
   activating an electric heating element of the cooktop appliance, the electric heating element positioned below a ceramic plate of the cooktop appliance;
   taking a plurality of temperature measurements with a temperature sensor of the cooktop appliance, the temperature sensor positioned proximate a bottom surface of the ceramic plate, the temperature sensor positioned above the electric heating element;
   determining a change between the plurality of temperature measurements over time;
   calculating a value of a control criterion with the change between the plurality of temperature measurements over time, the control criterion being a function of temperature and a temperature change with respect to time; and
   opening a relay of the cooktop appliance in response to the calculated value of the control criterion passing a threshold criterion value, the relay coupled to the electric heating element such that the relay is operable to selectively terminate electrical power to the electric heating element,
   wherein the calculated value of a control criterion is calculated with $$F\left(T, \frac{dT}{dt}\right) = A - B * \frac{dT}{dt} - T$$

where
F is the control criterion function,
T is temperature,
t is time,
dT/dt is temperature change with respect to time,
A is a first constant, and
B is a second constant.

10. The method of claim 9, wherein opening the relay comprises opening the relay in response to the calculated value of the control criterion passing the threshold criterion value or keeping the relay closed in response to the calculated value of the control criterion not passing the threshold criterion value.

11. The method of claim 9, wherein the relay terminates electrical power to the electric heating element when the relay is open.

12. The method of claim 9, wherein the threshold criterion value is about zero.

13. The method of claim 9, wherein values of A and B and the threshold criterion value are saved within a memory of the cooktop appliance and are selected such that the electric heating element does not heat a cooking utensil on the ceramic plate to more than seven hundred and fifty degrees Fahrenheit.

14. The method of claim 9, wherein the temperature sensor is radially offset from a center of the electric heating element by no less than one inch and no more than eight inches.

15. The method of claim 9, wherein the temperature sensor is radially offset from a center of the electric heating element and radially inset from an outer edge of the electric heating element.

16. The method of claim 15, wherein the temperature sensor contacts the bottom surface of the ceramic plate such that the temperature sensor is positioned between the ceramic plate and the electric heating element.

* * * * *